(12) United States Patent
Bitsche et al.

(10) Patent No.: US 7,215,059 B1
(45) Date of Patent: May 8, 2007

(54) RELUCTANCE MOTOR WITH AT LEAST TWO SALIENT POLES EACH PROVIDED WITH AN EXCITER WINDING, AND METHOD FOR MANUFACTURING THE STATOR OF SUCH RELUCTANCE MOTOR

(75) Inventors: Otmar Bitsche, Stuttgart (DE); Matthias Fuerst, Weinstadt (DE); Andreas Heller, Magstadt (DE); Werner Koenig, Herrenberg (DE); Andreas Moch, Gundelscheim (DE); Daniel Mueller, Goeppingen (DE); Armin Nickel, Esslingen (DE); Roland Zieker, Ebersbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/540,201

(22) Filed: Mar. 31, 2000

(30) Foreign Application Priority Data

Apr. 1, 1999 (DE) ................. 199 14 943

(51) Int. Cl.
H02K 1/24 (2006.01)
(52) U.S. Cl. ...................... 310/269; 310/218
(58) Field of Classification Search ........ 310/269, 310/267, 259, 218, 216, 168, 187, 183, 179, 310/214, 51, 67 R; 29/596, 598
See application file for complete search history.

(56) References Cited

U.S. PATENT DOCUMENTS

| 2,506,629 | A | * | 5/1950 | Bilde et al. | ................. | 171/209 |
| 2,907,904 | A | * | 10/1959 | Carpenter | ................... | 310/166 |
| 4,385,248 | A | * | 5/1983 | Laskaris | ...................... | 310/52 |
| 4,633,114 | A |   | 12/1986 | Reynolds | .................... | 310/194 |
| 5,502,341 | A | * | 3/1996 | Sato | ............................ | 310/42 |
| 5,698,917 | A | * | 12/1997 | Shultz | ........................ | 310/87 |
| 5,770,910 | A | * | 6/1998 | Horst | ......................... | 310/214 |
| 6,167,610 | B1| * | 2/2001 | Nakahara et al. | ............. | 29/596 |
| 6,225,725 | B1| * | 5/2001 | Itoh et al. | ................... | 310/254 |

FOREIGN PATENT DOCUMENTS

| DE | 880614 | | 6/1953 |
| DE | 91/11844 | * | 8/1991 |
| DE | 4220209 A1 | | 1/1993 |
| EP | 0605247 A2 | | 12/1993 |
| GB | 249213 | | 3/1926 |
| JP | 53-101602 | | 9/1978 |
| JP | 55-114161 | | 9/1980 |
| JP | 58-195118 | | 11/1983 |
| JP | 63-114540 | | 5/1988 |

* cited by examiner

Primary Examiner—Thanh Lam
(74) Attorney, Agent, or Firm—Crowell & Moring LLP

(57) ABSTRACT

A reluctance motor in which at least one snap ring engages the ends of the exciter coils remote from the stator yoke with radially outward acting spring force.

8 Claims, 2 Drawing Sheets

RELUCTANCE MOTOR WITH AT LEAST TWO SALIENT POLES EACH PROVIDED WITH AN EXCITER WINDING, AND METHOD FOR MANUFACTURING THE STATOR OF SUCH RELUCTANCE MOTOR

BACKGROUND AND SUMMARY OF THE INVENTION

This application claims the priority of German Application 19914943.7, filed Apr. 1, 1999, the disclosure of which is expressly incorporated by reference herein.

The invention relates to a reluctance motor with at least two salient stator poles each provided with an exciter winding, and to a method for the manufacture of the stator of such a reluctance motor.

Switching reluctance motors usually have numerous salient poles both in the stator and in the rotor. Each motor phase has at least one pair of stator poles lying diametrically opposite one another. An exciter winding is disposed on each stator pole. The two exciter windings on the stator poles are connected in series or in parallel. The stator and rotor poles consist of laminated sheet iron. When an exciter current is fed into the exciter windings, the stator poles are magnetized, so that magnetic attraction forces are exercised on the rotor, to thereby cause rotation.

The stator poles or stator teeth are integral components of the stator, i.e., the stator yoke and stator teeth consist of a single piece. The exciter coils are made self-supporting or they are held in coil boxes or coil frames. The self-supporting coils are wound on a form that can be taken apart, and after the removal of the form they remain held together, e.g., by tapes.

A reluctance motor is disclosed in European Patent EP 0 605 247 A2 wherein catch means are disposed at the axial ends of the spool bodies of the exciter windings, into which a stiff ring can be inserted. The coil bodies are fastened with the ring in the stator. A winding body serving as a coil box or coil frame supports the coil body.

A reluctance motor is disclosed in German Patent DE 42 20 209 A1, in which hollow cylindrical coil mountings are pressed on the inside of the heads of the coil windings in order to fasten the windings in the stator.

The exciter windings, constructed as independent units, are pushed over the stator poles or teeth and then fastened thereon. When current flows, radial forces are exerted against the coils. These forces must be absorbed by the fastening means. To fasten the coils wedges are driven manually into the gaps between adjacent coils so that the coils are clamped between the stator teeth. Such fastening by means of wedges is disclosed in German Patent DE PS 880 614. Then the gaps in the windings and the gaps between the stator teeth and the coils are filled with resin. The coils are securely and tightly bound to the stator in the manner described above.

Driving wedges between the coils is difficult and, especially in the case of a reluctance motor with numerous stator poles, it is very time-consuming. The coils are fixed in their position by pressing them onto the stator teeth. A resultant force acts on the coils which has an inwardly directed component. The friction between the coil and the stator teeth must be fairly great, since otherwise the coil is not firmly seated. Also, the coils take up part of the space between the adjacent stator teeth. This space is not available for the coil windings.

The invention therefore is addressed to the problem of preparing and manufacturing a reluctance motor with at least two stator poles each provided with an exciter coil, in which radial forces acting toward the stator yoke are exerted simultaneously on all exciter coils and hold the exciter coils in their positions on the stator poles.

The problem is solved according the invention, in a reluctance motor by using at least one snap ring springing radially outward with its outer side under spring bias against the sides facing the rotor of the exciter coils surrounding the stator poles or of their winding bodies. The snap ring exerts a force directed radially outwardly against the exciter coils. The force holds the exciter coils against the rotor yoke with their ends facing away from the rotor or facing towards the corresponding ends of the coil frame or coil box. The exciter coils are held fast between the snap ring and the yoke of the stator by the force from the snap ring, i.e., they are gripped between them. It is also possible to provide abutments between the ends of the coils or their frames or coil boxes facing away from the stator yoke and the rotor, against which the corresponding ends of the exciter coils or frames or coil boxes are then urged under the influence of the spring force. The installation of snap rings is a simple measure requiring but a few manipulations. The mounting of the exciter coils is thereby substantially simplified. After the exciter coils are fixed in their position with the snap ring, they can be filled with casting resin. Another advantage of the present invention is that the entire space between the stator teeth is available for the windings.

Preferably, a groove for the insertion of the snap ring is provided in the stator poles in or approximately in the center of the end facing the rotor. With this structure, the snap ring is also held in a simple manner in the axial direction of the reluctance motor.

In one preferred embodiment a snap ring is provided, axially of the stator, on each side of the stator teeth, and is urged against the end of the coil, coil frame or coil box facing the rotor. This embodiment is advantageous whenever the reluctance motor has a great axial length, because the force pressing against the coils is then more uniformly distributed.

The snap ring consists especially of a magnetic or nonmagnetic steel. Therefore no iron losses develop in the snap ring. Since the snap ring is not a full ring, the eddy current losses occurring in operation are of no importance.

Other objects, advantages and novel features of the present invention will become apparent from the following detailed description of the invention when considered in conjunction with the accompanying drawings.

BRIEF DESCRIPTION OF THE DRAWINGS

The invention is further described hereinafter with the aid of embodiments represented in a drawing, wherein.

DETAILED DESCRIPTION OF THE PREFERRED EMBODIMENT

Figure 1:
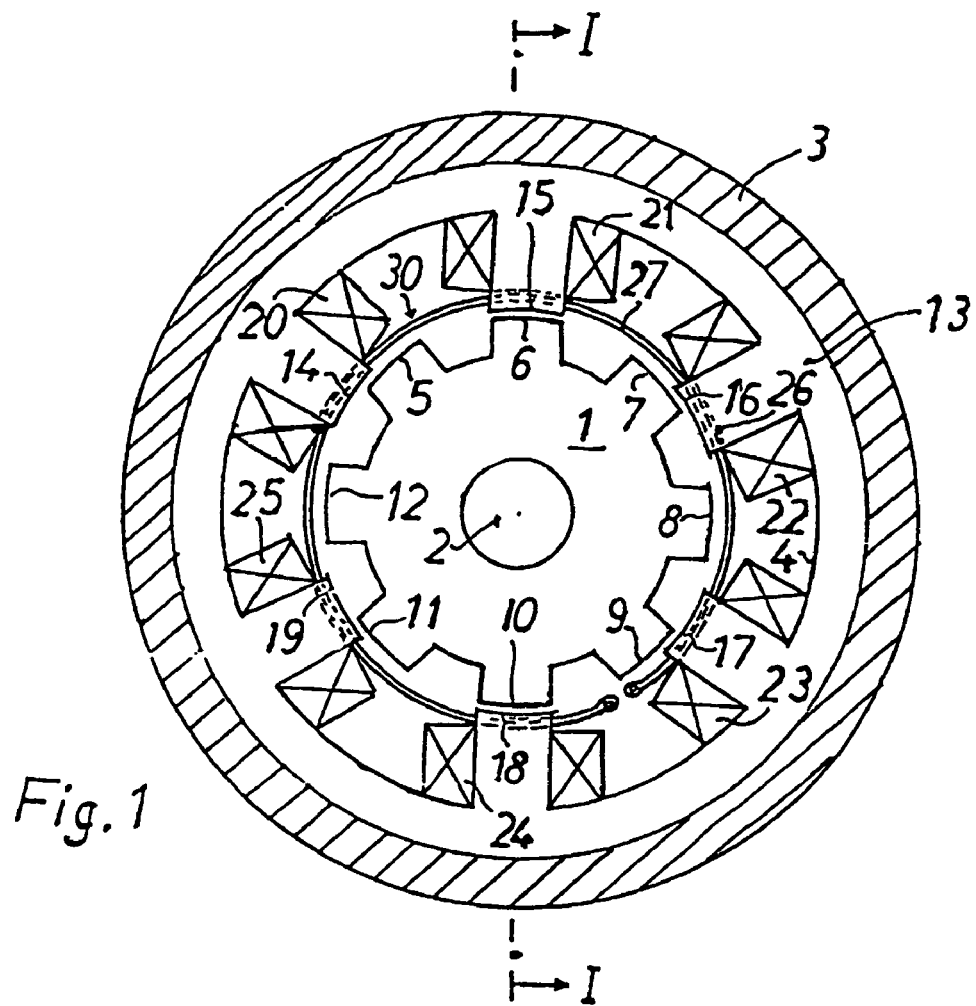
FIG. 1 shows a schematic cross section through a three-phase reluctance motor.

A reluctance motor has a rotor 1 fastened on a shaft 2 which is mounted for rotation in a housing 3. A stator 4 with a stator yoke is disposed coaxially with the rotor 1 within the housing 3 and fastened to the housing 3.

Rotor 1 and stator 4 are composed of laminated sheet iron. The rotor 1 has eight stamped poles 5, 6, 7, 8, 9, 10, 11, 12, which are arranged on the outer periphery at equal intervals from one another. Poles 5 to 12 are also referred to hereinafter as rotor teeth. The stator 4 has a hollow cylindrical yoke 13 from which six magnet poles or stator poles 14, 15, 16, 17, 18, 19 extend radially outward. The magnet poles 14 to 19, which are also referred to hereinafter as stator teeth, are arranged apart at equal intervals. The air gap between confronting stator and rotor poles is usually less than a millimeter. The magnet poles 14 to 19 have each parallel sides extending in the axial direction of the housing 3 and form one unit with the yoke 13.

Exciter coils 20, 21, 22, 23, 24, 25, are each disposed on the stator poles 14 to 19. The following pairs of exciter coils are connected in series: 20 and 23, 21 and 24, and 22 and 25.

The exciter coils 20 to 25 can each be made self-supporting or they can be held by winding forms. At the radially outside ends of the stator poles 14 to 19 the exciter coils 20 to 25 abut against the yoke 13. The exciter coils 20 to 25 are each set back radially outward against the end faces of the stator poles 14 to 19. The exciter coils 20 to 25 have a rectangular cross section.

When the reluctance motor is to be assembled, after the stator laminations have been put together and mounted, the exciter coils 20 to 25 are manually placed over the stator poles 14 to 19.

In each of the end faces of the stator poles 14 to 19, there are grooves 26 which extend along an imaginary circle, which is concentric with the shaft 2 and the rotor 1. A snap ring 27 is placed in the grooves 26 and its spring force is directed radially outward. At its outside margin 30 the snap ring 27 presses the exciter coils 20 to 25 outwardly with spring bias, causing the exciter coils 20 to 25 to have their ends positioned remote from the rotor against the yoke 13. The exciter coils 20 to 25 are thus fixed in their radial positions. The exciter coils 20 to 25 can no longer shift radially inward, so that it is assured that they can no longer come close to the poles 5 to 12 of the rotor 1.

After the exciter coils 20 to 25 are fastened on the stator poles 14 to 19, they are embedded in casting resin, so that, after curing, a solid bond exists between the exciter coils 20 to 25 and the stator poles 14 to 19 as well as the yoke 13. It is no longer necessary to fasten the exciter coils 20 to 25 with wedges. Therefore the space between adjacent stator poles are completely available, if needed, for the windings of exciter coils.

Therefore exciter coils of a cross section other than rectangular can also be used, so as to achieve, for example, a greater magnetic flux in the stator poles and thus provide a greater power from the reluctance motor.

Figure 2:
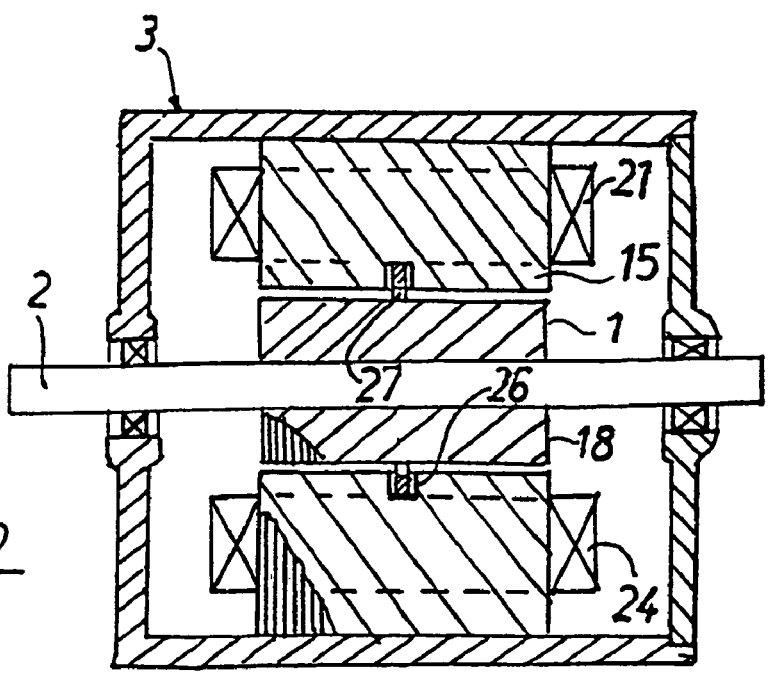
FIG. 2 schematically illustrates the reluctance motor represented in FIG. 1, in longitudinal section along lines I—I.

In reluctance motors of relatively great axial length, two or more snap rings can also be placed in grooves in the stator poles to keep the coils in their radial position. FIG. 2 shows the completed reluctance motor of FIG. 1 in a longitudinal section. The structure of the rotor 1 and stator 4 of laminated sheet iron is indicated in FIG. 2.

Figure 3:
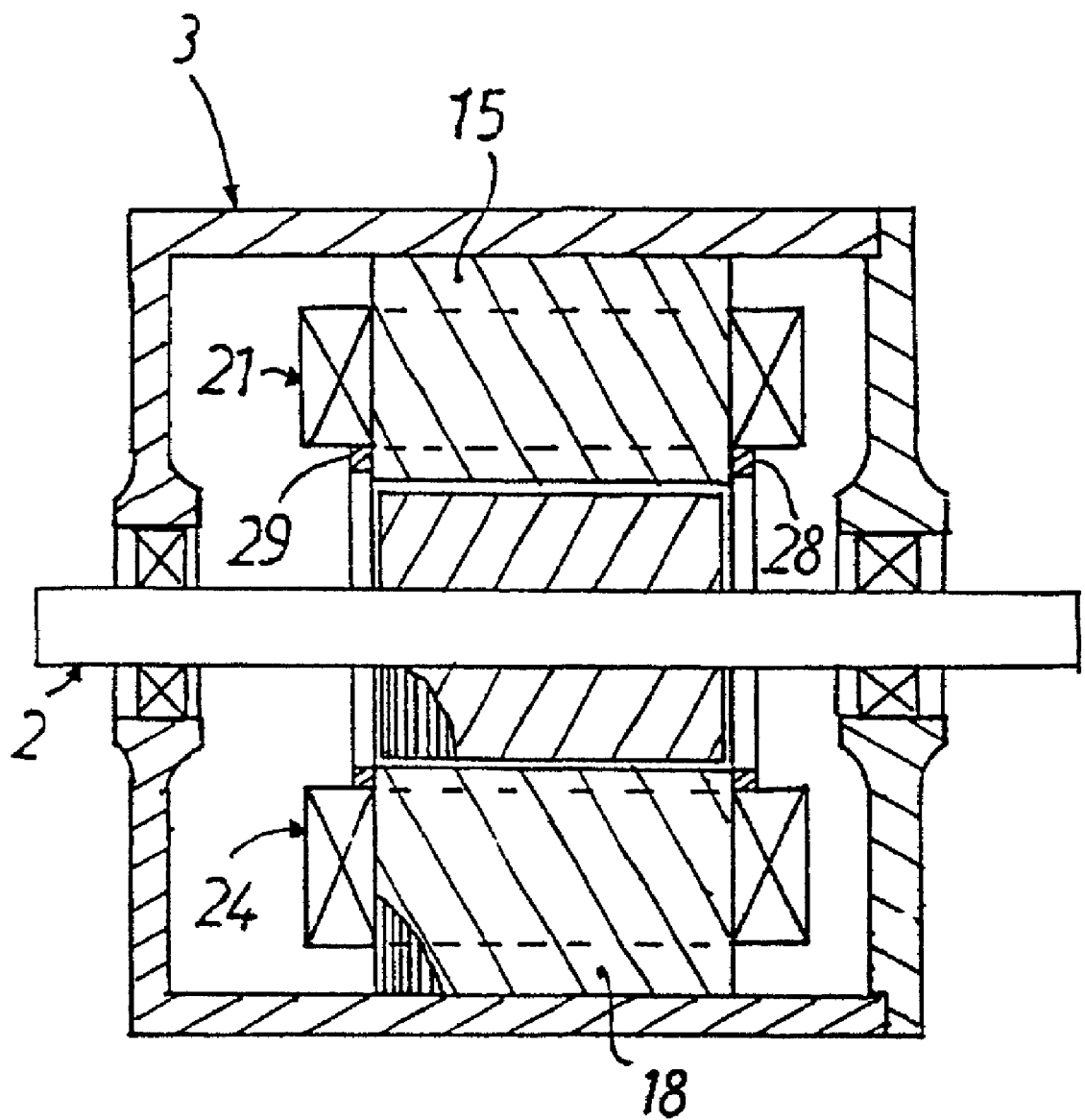
FIG. 3 is another embodiment of a reluctance motor shown schematically in longitudinal section.

Another embodiment of a reluctance machine is represented in longitudinal section in FIG. 3. The same reference numbers indicate like components of the embodiments of FIGS. 1, 2 and 3 Except for a few differences the embodiment of FIG. 3 is substantially identical to those of FIGS. 1 and 2. On the one hand in the case of the embodiment according to FIG. 3, no groove is provided in the stator poles, and on the other hand two snap rings 28 and 29 on both ends of the stator 4 exert forces radially outward on the exciter coils. The embodiment in FIG. 3 is especially appropriate for reluctance motors of relatively great axial length. The snap rings 28 and 29 are bonded tightly to the exciter coils and the stator poles 14 to 19 when the exciter spools 20 are potted with resin.

The snap rings 27, 28 and 29 can consist of nonmagnetic or magnetic spring steel. If a groove 26 is provided in the stator 13, the snap ring is preferably made of magnetic steel since it then serves as a quasi component of the stator plates. Since the snap rings are not full rings the eddy currents cause only insignificant losses while the reluctance motors are running.

In the manufacture of a reluctance motor of the kind described above the stator is made from laminated sheet iron. After the pack of stator laminations is formed the exciter coils 20 to 25, made as independent units, are placed over the stator poles 14 to 19. This can be done by hand. Then with a tool such as a snap ring plier the snap ring 27 is placed on the ends of the exciter remote from the stator yoke. Then the tool is removed from the snap ring. The snap ring 27 then, by virtue of its radial expansion, forces the exciter coils 20 to 25 against the yoke 13 and fixes them in their radial position. Then the spaces between the turns in the coil and between the exciter coils 20 to 25 and stator poles 14 to 19 are filled up with casting resin.

After the casting resin is cured the reluctance motor is finished in the usual manner.

The arrangement according to the invention can be advantageously used in electric motors in which coils are to be inserted in a manner similar to those in a reluctance motor.

The (automatic) pressure curing method is also to be mentioned as an alternative method for fastening and simultaneously insulating the coils in an electric motor with stator and rotor with a casting composition. The method and corresponding devices are described in German Patent DE 43 44 922 C2, DE 42 10 687 A1 and DE 2651827 A1.

When casting by the pressure curing method (full casting) a stator and/or rotor are preheated, fitted into a mold with a closed cavity and, optionally, the mold is evacuated. Then the casting composition is injected with gentle pressure and fills out all of the remaining cavities of the stator and/or rotor.

After a few minutes the casting composition is set and the component can be removed completely insulated. The method also permits the use of greatly filled molding composition so that the properties of the casting composition (e.g., low shrinkage, improved mechanical properties etc.) can be broadly optimized.

The manufacture of molded objects and a selection of appropriate casting compositions (one- or two-component systems) can be found in disclosures EP 0 813 945 A2, EP 0 673 104 B1, U.S. Pat. No. 5,906,784, WO 9832138, EP 0 578 613 A2, and EP 0 449 776 A2, among others.

According to this method a higher dimensional accuracy and work ability of the pressure-set bonding is obtained in comparison with the bonding of coils and stator with conventional casting resin.

The method furthermore brings about an increase in the thermal conductivity of the component and thus an increase of power plus quieter operation of the electric motor made in this manner. Furthermore, the method can likewise be used advantageously in the production of electromagnetic valve control, starter/generators and electrotraction drives.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reluctance motor comprising:
   a rotor and at least two salient stator poles wherein each of said stator poles has an exciter coil surrounding respective stator poles with one end of each of said exciter coils facing said rotor;
   a spring biasing device, consisting of at least one snap ring, contacting said end of each of said exciter coils facing said rotor wherein said spring biasing device provides a radially outward force on the ends of said exciter coils facing said rotor in a direction away from said rotor.

2. The reluctance motor according to claim 1, wherein said exciter coils are gripped between the spring biasing device and a yoke of the stator.

3. The reluctance motor according to claim 1, wherein each of said stator poles has a groove in at proximately the center of the end facing the rotor wherein said groove receives said spring biasing device.

4. The reluctance motor according to claim 1, wherein in the axial direction of a yoke of the stator, at each end of the stator poles, an outwardly springing one of said at least one snap springs contacts the ends of the exciter coils facing the rotor.

5. The reluctance motor according to claim 1, wherein each of said at least one snap ring is disposed of one flat side adjacent said stator poles.

6. The reluctance motor according to claim 1, wherein each of said at least one snap ring is made of spring steel.

7. A method for the manufacture of a stator of a reluctance motor having at least two salient stator poles each provided with an exciter winding, said method comprising the acts of:
   assembling sheet iron laminations of the stator;
   disposing exciter windings on the assembled sheet iron laminations;
   applying at least one snap ring to ends of exciter coils facing away from a yoke of the stator;
   applying casting resin to the exciter coils and interstices between the exciter coils; and
   curing the casting resin.

8. A reluctance motor having a motor and at least two salient stator poles with each of said stator poles being provided with an exciter coil, said reluctance motor further comprising at least one spring biasing means, consisting of a snap ring, positioned against an end of each of said exciter coils which faces said rotor to apply a radial force to said exciter coils in a direction away from said rotor.

* * * * *